(12) United States Patent
Timmermann et al.

(10) Patent No.: US 8,393,668 B2
(45) Date of Patent: Mar. 12, 2013

(54) PANE ARRANGEMENT

(75) Inventors: Alwin Timmermann, Cologne (DE);
Frank Tauwaldt, Hof (DE); Wolfgang Chlebecek, Rehau (DE); Steffen Gruber, Rehau (DE)

(73) Assignees: Saint-Gobain Glass France, Aubervilliers (FR); Rehau AG+Co., Rehau (DE)

( * ) Notice: Subject to any disclaimer, the term of this patent is extended or adjusted under 35 U.S.C. 154(b) by 219 days.

(21) Appl. No.: 12/811,472

(22) PCT Filed: Dec. 3, 2008

(86) PCT No.: PCT/EP2008/010217
§ 371 (c)(1),
(2), (4) Date: Oct. 11, 2010

(87) PCT Pub. No.: WO2009/086870
PCT Pub. Date: Jul. 16, 2009

(65) Prior Publication Data
US 2011/0018303 A1  Jan. 27, 2011

(30) Foreign Application Priority Data

Jan. 4, 2008 (DE) .......................... 10 2008 003 252

(51) Int. Cl.
*B60J 1/00* (2006.01)
(52) U.S. Cl. ...................................................... 296/84.1
(58) Field of Classification Search ................. 296/84.1, 296/201; 49/501, 502, 504; 52/204.591, 52/208, 202, 204.597, 656.5
See application file for complete search history.

(56) References Cited

U.S. PATENT DOCUMENTS

| 3,759,004 | A | * | 9/1973 | Kent | 52/204.597 |
| 3,783,568 | A | * | 1/1974 | Adler et al. | 52/204.597 |
| 3,843,982 | A | * | 10/1974 | Lane et al. | 114/361 |
| 4,240,227 | A | * | 12/1980 | Hasler et al. | 49/348 |
| 4,523,783 | A | * | 6/1985 | Yamada | 296/93 |
| 4,627,145 | A | * | 12/1986 | Niemanns | 29/450 |
| 4,650,240 | A | * | 3/1987 | Rinella | 296/93 |
| 4,823,511 | A | * | 4/1989 | Herliczek et al. | 49/404 |
| 4,839,122 | A | * | 6/1989 | Weaver | 264/129 |
| 4,840,001 | A | * | 6/1989 | Kimisawa | 52/208 |
| 4,968,543 | A | * | 11/1990 | Fujioka et al. | 428/31 |

(Continued)

FOREIGN PATENT DOCUMENTS

DE  36 43 472  12/1987
EP  1 280 675  2/2003

(Continued)

*Primary Examiner* — Kiran B Patel
(74) *Attorney, Agent, or Firm* — Oblon, Spivak, McClelland, Maier & Neustadt, L.L.P.

(57) ABSTRACT

A pane arrangement including a pane, for example a vehicle windscreen, and a holding section joining an attachment part to the pane, the holding section connected in a first connecting strip, which runs parallel to an edge of the pane, to a surface of the pane by a self-adhesive tape, and connected in a second connecting strip, which also runs parallel to the edge of the pane, to a surface of the pane by an adhesive applied in a flowable state and having a greater hardness than the self-adhesive tape. The second connecting strip is arranged nearer the edge of the pane than the first connecting strip, and thereby the connection between the pane and the holding section is as stiff as possible and yet the pane arrangement can be produced quickly and without a high outlay.

10 Claims, 1 Drawing Sheet

U.S. PATENT DOCUMENTS

| | | | | |
|---|---|---|---|---|
| 4,994,315 | A * | 2/1991 | Schreiber et al. | 428/76 |
| 5,070,590 | A * | 12/1991 | Fujioka et al. | 29/527.2 |
| 5,214,824 | A * | 6/1993 | Lesser et al. | 16/225 |
| 5,421,130 | A * | 6/1995 | Weber et al. | 52/208 |
| 5,567,239 | A * | 10/1996 | Ribic, Jr. | 118/504 |
| 5,806,257 | A * | 9/1998 | Cornils et al. | 52/208 |
| 5,898,407 | A * | 4/1999 | Paulus et al. | 343/713 |
| 5,918,420 | A | 7/1999 | Timmermann | |
| 6,364,404 | B1 * | 4/2002 | De Paoli | 296/201 |
| 6,460,917 | B2 * | 10/2002 | De Paoli | 296/201 |
| 6,769,700 | B2 * | 8/2004 | Ortmuller et al. | 277/642 |
| 6,794,882 | B2 * | 9/2004 | Jessup | 324/522 |
| 7,806,455 | B2 * | 10/2010 | Polke | 296/93 |
| 2001/0047058 | A1 * | 11/2001 | Johnson et al. | 525/192 |
| 2003/0057660 | A1 | 3/2003 | Ortmuller et al. | |
| 2003/0066255 | A1 | 4/2003 | Cripe | |
| 2004/0035066 | A1 * | 2/2004 | Leconte | 52/204.591 |
| 2006/0165977 | A1 | 7/2006 | Rehfeld et al. | |
| 2006/0232093 | A1 * | 10/2006 | Boehm et al. | 296/96.21 |
| 2006/0266460 | A1 * | 11/2006 | Kreye | 156/107 |
| 2007/0246966 | A1 | 10/2007 | Polke | |
| 2008/0056505 | A1 | 3/2008 | Rehfeld et al. | |
| 2011/0115261 | A1 * | 5/2011 | Platt et al. | 296/208 |
| 2011/0181071 | A1 * | 7/2011 | Schaff et al. | 296/93 |
| 2011/0285177 | A1 * | 11/2011 | Flammer et al. | 296/208 |
| 2012/0126567 | A1 * | 5/2012 | Timmermann | 296/96.21 |

FOREIGN PATENT DOCUMENTS

| | | |
|---|---|---|
| EP | 1 634 753 | 3/2006 |
| FR | 2 843 227 | 2/2004 |
| WO | 2004 103754 | 12/2004 |
| WO | 2006 022891 | 1/2006 |

* cited by examiner

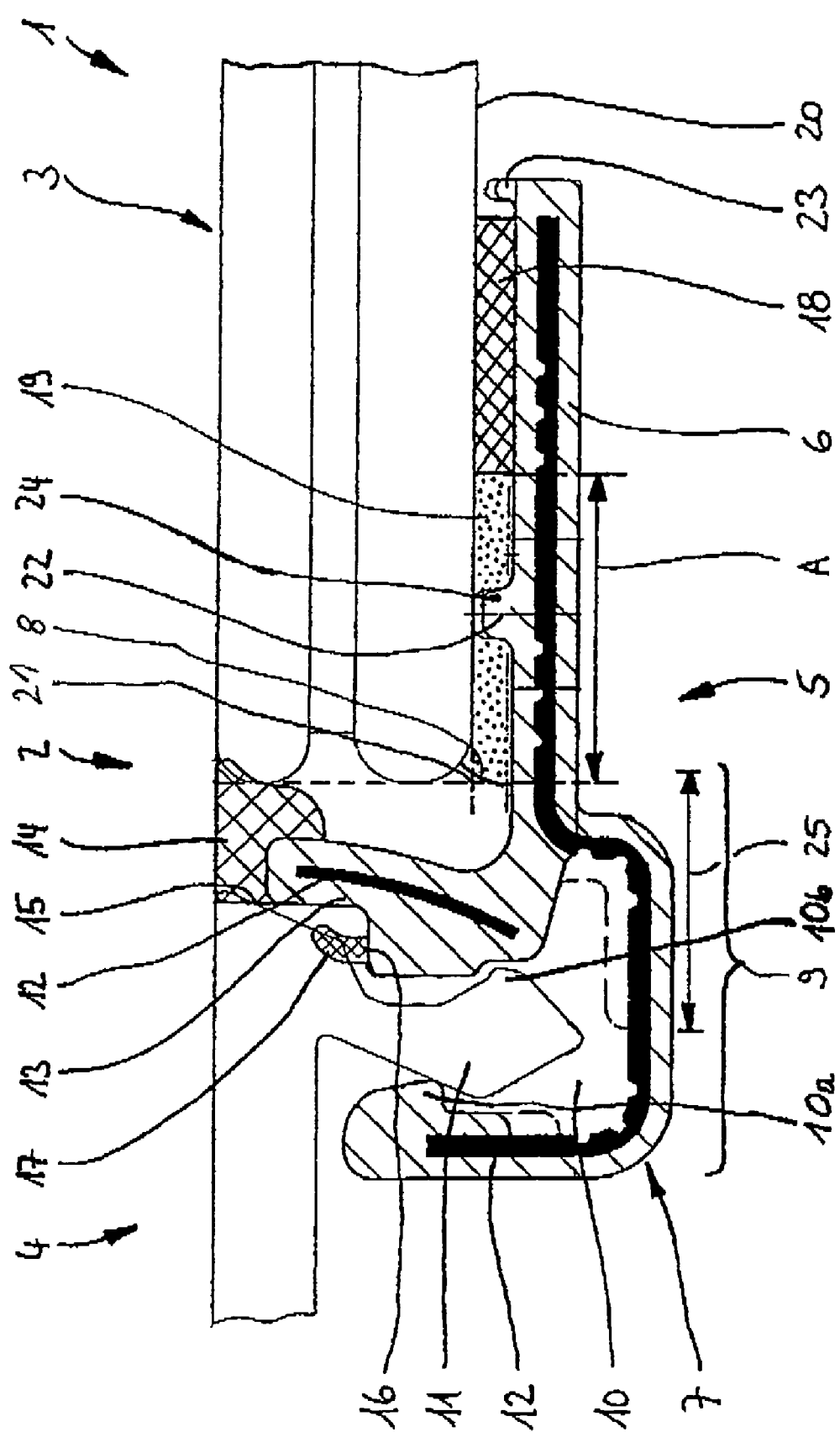

PANE ARRANGEMENT

TECHNICAL FIELD

The invention relates to a pane arrangement comprising a pane, in particular a vehicle windscreen, and a holding section for joining an attachment part to the pane, the holding section being connected in a first connecting strip, which runs parallel to an edge of the pane, to a surface of the pane by means of a self-adhesive tape, and being connected in a second connecting strip, which likewise runs parallel to the abovenamed edge of the pane, to a surface of the pane by means of an adhesive which is applied in the viscous state and has a greater hardness than the self-adhesive tape.

BACKGROUND

As emerges, for example, from DE 199 61 706 B4, it is known from the prior art to use an adhesive strand to bond with a holding section a windscreen made from composite glass in the region of its edge which runs along a vehicle body and faces the engine bonnet. Use is normally made as adhesive strand of a double-sided adhesive tape which is formed from a foamlike middle layer which, in turn, is provided on both sides with an adhesive layer. A disadvantage of this is that the adhesive strand behaves like a type of sponge having pronounced elastic properties such that the connection is not sufficiently stiff to be able to clip an attachment part on the body without supporting the holding section.

Furthermore, after being installed in a vehicle the holding section provided with the windscreen is connected to another vehicle part, for example a water box cover, by means of clip connections located at freely protruding areas, it being important for correct mounting that the holding section opposes the applied pressure with a sufficient resistance. The connection of the holding section to the windscreen is, however, too soft when use is made of a double-sided adhesive tape, and so a fitter cannot establish straight away whether the components have been properly joined together.

The freely protruding area of the holding section at which the last named is connected to another vehicle part has, on the one hand, a certain elasticity and, on the other hand, the adhesive layer as such. When the pane is installed in the vehicle, it is thus impossible for a fitter to distinguish whether to deform the protruding area of the holding section or to displace it overall, or to latch the clip connection properly, something which takes place only after overcoming a certain closing force.

Furthermore, it is generally known from the prior art for a holding section and pane to be connected not by the above-described adhesive tape but, instead, by a chemically cured adhesive such as polyurethane adhesive, which has a substantially greater hardness than an adhesive tape. The lesser flexibility of the connection permits only slight extensions for the same force applied, and so a proper engagement of the clip connections at the holding section and vehicle part can be more effectively determined. However, a disadvantage of this connection is that the adhesive requires a certain setting time before it is cured and produces a stable connection. Consequently, holding element and pane must be fixed in their position with the aid of suitable means for the duration of the setting, and this signifies a not inconsiderable extra outlay.

EP 1 280 675 B1 describes a sealing arrangement for vehicle panes in the case of which the pane is connected to a holding element firstly by a double-sided adhesive tape, and secondly by a so-called "adhesive bead" made from a soft curing material. The stiffness of the connection by comparison with the connection disclosed in DE 199 61 706 B4 should thereby already be substantially increased. Nevertheless, the double-sided adhesive tape which is arranged between the windscreen and the holding element continues to cause a certain softness in the connection, and this likewise entails the abovementioned disadvantages.

SUMMARY

Object

It is an object of the present invention to further develop a pane arrangement of the type mentioned at the beginning such that the connection between the pane and the holding section is as stiff as possible while still being able to be produced quickly and without a high outlay.

Achievement

Proceeding from the known pane arrangements, the object is achieved according to the invention by virtue of the fact that the second connecting strip is arranged nearer the edge of the pane than the first connecting strip.

If the pane is not designed with sharp edges in the area of the holding section fastened thereto, in accordance with the present application the edge of the pane is defined as the line of intersection of the plane of the outer pane surface with the plane formed by the outermost of the typically rounded end faces of the pane (line of intersection of two tangential planes).

As already described previously, panes, in particular vehicle windscreens, are provided along one edge with a holding section which serves to join an attachment part to the pane, an area of the holding section which protrudes over the pane and has a certain elasticity being provided with elements for a clip connection.

The connection of holding section and pane is achieved by two connecting strips running parallel to the edge, and this entails advantages both for mounting this connection and for the joined state of the pane with the holding section.

The connection is mounted in two steps: firstly, the adhesive for the second connecting strip 19 may be applied to the glass surface 20 in the vicinity of the intersection point 21. Alternatively, the adhesive can also be applied to the holding limb 6 of the holding section 5 in the form of a triangular bead, for example. During the joining process of pane arrangement 1 and the holding section 5, the adhesive is pressed into the illustrated shape of the second connecting strip 19. The first connecting strip 18, comprising the self-adhesive tape, immediately adheres to the surface when pressed on. This connection is certainly a relatively soft connection, since self-adhesive tapes usually have a specific elasticity, but the connection thus produced serves principally to fix the position of the two elements comprised of holding section and pane.

The connection already achieved by the self-adhesive tape is supplemented in the course of the mounting in the next step by a second connecting strip which is applied near the edge of the pane in a viscous state, and which has in its cured state a greater hardness than the self-adhesive tape. Owing to the connection produced by the previously applied self-adhesive tape, there is no need to further fix the position of the elements for the duration of the curing of the second connecting strip, and this facilitates the operation of mounting the pane arrangement.

The stiffness of the protruding area of the holding section is composed of the elasticity of the protruding area as such, and the connection between pane and holding section. The position of the stiffer of the two connections further plays a role in the mounting of the water box cover on the pane of a vehicle, since the deformation which is caused by the force to be applied to engage the clip connection is a function of the lever arm of the force to be applied. By comparison with EP 1 280 675 B1, the arrangement of the stiffer connecting strip and the softer connecting strip is interchanged such that the stiffer connection near the edge shortens the free lever arm of the force acting on the holding section.

With reference to the state of the pane when joined together with the holding section, the arrangement of the second connecting strip, which has a greater hardness than the self-adhesive tape, in the vicinity of the edge of the pane is advantageous because the connection between holding section and pane at this point is of greater stiffness and therefore higher than in the case of conventional pane arrangements. If the pane arrangement is now connected to an attachment part by means of the clip connection, upon application of a force a higher resistance results for the pane provided with the holding section, and so the defined forces required for an engagement of the clip connection can be applied more lightly, and a certain marked resistance of the holding section (formed by the overall higher stiffness of pane and holding section, that is to say pane arrangement) results after engagement of the clip connection.

Owing to the position of the second and stiff connecting strip near, or up to the edge of, the pane, or therebeyond, the lever arm for the force to be applied becomes small, and this in turn has the advantage that the holding section is less deformed. At its edge having the holding section, the pane arrangement has an overall higher stiffness than conventional comparable pane arrangements.

It is particularly advantageous when the self-adhesive tape has a foamlike middle layer and two adhesive layers arranged on opposite visible surfaces of the tape, since what is involved here is a commercially available product which is distinguished by a good and easy processability. Furthermore, it is advantageous when the adhesive applied in the viscous state is a polyurethane (PU)-based adhesive. Polyurethane adhesive is comparatively stiff or hard in the cured state. The hardness of the adhesive in the cured state should preferably be at least 50-90 Shore A hardnesses.

A refinement of the invention provides that the holding section 5 is provided in the region of the connecting strips with at least one spacer, which is connected in one piece to the rest of the holding section, in contact with the surface of the pane, and defines the thickness of the layer of the adhesive applied in the viscous state. It is advantageous that a second spacer 23 which counteracts a tilting during the joining process, and thus also a "pumping" of the still deformable, viscous adhesive, are avoided. This ensures a regular formation of the second connecting area, which plays a large role in the quality of the pane arrangement.

It is, furthermore, advantageous here when there are present two strip-shaped or bead-shaped spacers which run in a longitudinal direction of the connecting strips and of which the second is arranged inside the second connecting strip, and the first forms an edge closure of the first connecting strip and the holding section. This results in the pane bearing against the holding section in a uniform fashion over the entire width of the connecting strip.

An advantageous development of the invention provides that the two connecting strips adjoin one another in their longitudinal direction. This is preferably achieved further to the fact that the adhesive applied in the viscous state runs up to the self-adhesive tape.

In accordance with a further refinement of the inventive pane arrangement, the holding section has in the region of the second connecting strip cutouts which are distributed one behind another in a longitudinal direction of said connecting strip, arranged equidistantly relative to one another, and interrupt a strip-shaped or bead-shaped spacer. The cutouts are preferably designed as round or elongated holes. The diameter of the round holes is preferably in the range of 1-4 mm, or in the range of 1.5 to 3 mm. The long side of the elongated holes is preferably in the range of magnitude of between 1.5 and 6 mm. The advantage of these cutouts is. A further advantage is that the cutouts ensure that the humidity from the ambient air has unhindered access to the adhesive, and that thereby it is possible to use moisture-curing adhesives such as, for example, PU adhesives customary for bonding panes in the vehicle body. It is thereby possible to avoid problems owing to slow curing. The adhesive customary here cures at approximately 3 mm/day, and so the holes are important only in the case of moisture-curing adhesive. No holes are required when use is made of 2-component adhesive.

It is advantageous, furthermore, when the holding section has a core consisting of a stiffer material, and a coating which is made from plastic material, consisting of a more flexible material by comparison with said core, and is applied by extrusion or injection moulding around the core. The core effects an increased stiffness of the holding section, and there is a substantial improvement as a result both in the mounting of the pane and in the state in which the latter is installed in a vehicle.

It is particularly advantageous in this context when the core consists of metallic material, examples to name being aluminium, stainless steel or titanium, or spring steel or structural steel.

It is, furthermore, advantageous when the holding section is provided with a clamping channel which is undercut in cross section and runs parallel to the edge of the pane. This serves as an element of a clip connection to a component of the vehicle which is then provided with a counterpiece, designed as projection, of the clip connection.

Furthermore, it is advantageous when a limb of the holding section which faces the edge of the pane and bounds the groove is provided with an end section made from an elastomeric material which is more flexible by comparison with the rest of the coating. In this case, the end section is integrally formed in one piece on the holding section by coextrusion, and the end section touches an end face of the pane coming out from the edge of the pane. By contrast, apart from the end section itself, a free space remains between the limb with the end section and the end face of the pane. The end section can serve as seal between pane and a component bordering thereon, and is well adapted because of its great elasticity to the geometry of the components to be sealed in relation to one another.

BRIEF DESCRIPTION OF THE DRAWINGS

FIG. 1 shows a cross-sectional view according to an exemplary embodiment of the present disclosure.

DETAILED DESCRIPTION

Exemplary Embodiment

The invention is explained in more detail below with the aid of an exemplary embodiment which is illustrated in the drawing.

FIG. 1 shows a section through an inventive pane arrangement 1 in a transitional area 2 from a vehicle windscreen 3 to a water box cover 4, both the vehicle windscreen 3, which consists of a composite glass, and the water box cover 4 being illustrated only partially.

The connection between the windscreen 3 and the water box cover 4 is achieved via a holding section 5 which runs along the length of the transitional area 2 which, in its cross section illustrated in FIG. 1, on the one hand has a holding limb 6 and on the other hand has a groove-forming latching section 7 which is of approximately U- or V-shaped design and forms, in turn, an area 9 protruding over an edge 8 of the windscreen 3. The approximate U- or V-shape of the groove-forming latching section 7 is formed by an undercut clamping channel 10 in which a latching hook 11 located on the water box cover 4 engages in the fashion of a clip connection.

The holding section 5 is equipped with a core 12 made from aluminium, the stiffness of the holding section 5, which otherwise consists of plastic material, thereby being substantially increased.

A multiply undercut limb 13, facing the edge 8 of the windscreen 3, of the clamping channel 10 of the holding section 5 is provided with an end section 14 which consists of an elastomeric material which is more flexible by comparison with the customary plastic material of the holding section 5. This end section 14 is integrally formed in one piece on the holding section 5 by coextrusion and bears against the end face 15 of the water box cover 4 and against the windscreen 3. This effects a tighter transition from the windscreen 3 to the water box cover 4. Apart from the end section 14, the multiply undercut limb 13 of the clamping channel 10 is designed such that it does not touch the windscreen 3, a free space thus remaining between the actual limb 13 and the windscreen 3.

This multiply undercut limb 13 of the clamping channel 10 has, in addition, a steplike projection 16 on which there is arranged a sealing lip 17 which is likewise formed from an elastomeric material which is more flexible by comparison with the plastic material of the holding section 5. This sealing lip 17 has the effect, furthermore, that it presses the water box cover 4 upwards because it also has a spring action, and thus the latching components B, that is to say the components of the clamping channel (7, 9, 13) and the latching hooks 11, no longer have play. These bear against the water box cover 4 in such a way that it effects an additional sealing between water box cover 4 and windscreen 3.

In a way similar to the holding section 5, both the end section 14 and the sealing lip 17 of the limb 13 extend per se over the entire length of the edge 8 of the windscreen 3.

The holding section 5 is connected to the surface 20 of the windscreen 3 by means of two connecting strips 18 or 19 which respectively run parallel to the edge 8 of the windscreen 3 and consequently extend along the length of the transitional area 2. A first connecting strip 18 is formed by a self-adhesive tape which is arranged on the side of the holding limb 6 averted from the edge 8 of the windscreen 3, and is thus located at a spacing A from the edge 8. The self-adhesive tape 18 can preferably consist of a foamlike material which is provided on both its surfaces with an adhesive layer. It can be considered as a way of fixing the position of holding section 5 and windscreen 3 that is required during the curing of the adhesive.

The second connecting strip 19 is formed, for example, by a polyurethane adhesive (PU adhesive) and is located in an area of the holding limb 6 facing the edge 8 of the windscreen 3. Other conceivable adhesives are silicone, acrylates, hot-melts or 2-component adhesives. In FIG. 1, the second connecting strip 19 on the one hand borders the first connecting strip 18 formed by the tape, and on the other hand reaches as far as the edge 8 of the windscreen 3, which is defined on the basis of the existing rounding by the intersection point 21 of the planes of the outer pane surface 20 and of the outermost end face of the windscreen 3. It is likewise possible to provide the second connecting strip 19 beyond the edge 8 of the windscreen 3 such that the PU adhesive likewise bears against a sub-area of the end face of the windscreen 3.

The PU adhesive is preferably already applied before the holding section 5 is connected to the windscreen 3; it is unimportant in this case whether it is applied to the windscreen 3 or to the holding section 5. Alternatively, the PU adhesive can be pressed in through the cutouts, give way to both sides and reach on one side as far as the first connecting strip 18, and on the other side as far as or beyond the edge 8 of the windscreen 3.

The holding limb 6 of the holding section 5 is provided with two spacers 23, 24 on its surface facing the windscreen 3, a first spacer 23 being arranged at the end of the holding limb 6 averted from the edge 8 of the windscreen 3, and a second spacer 24 being arranged in the area of the second connecting strip 19. The spacers 23, 24 are integrally formed in one piece on the rest of the holding section 5, run in a longitudinal direction of the holding section 5 and are of strip-shaped design.

They bear against the surface 20 of the windscreen 3 and define a specific thickness of the adhesive located in the area of the second connecting strip 19. The first spacer 23 additionally prevents a tilting of the holding limb 6 during the pressing operation. The tilting must be prevented because there is consequently no change in volume of the second connecting strip 19 during the joining process.

The inventive arrangement of the two connecting strips 18, 19 substantially increases the stiffness of the holding section 5, which is composed, firstly, of the stiffness of the protruding area 9 and, secondly, of the stiffness of the connection between holding section 5 and windscreen 3, by comparison with conventional pane arrangements.

Directly next to the protruding area 9 of the holding section 5, the inventive pane arrangement 1 has a connection in the form of the second connecting strip 19 which, owing to the material, is distinguished by great hardness, that is to say stiffness. The lever arm 25 of the force to be applied to the clip connection is substantially shortened so that said force causes a substantially lesser deformation of the holding section 5. The higher stiffness of the holding section 5 opposes the force applied thereon with sufficient resistance, and the clip connection engages properly.

LIST OF REFERENCE SYMBOLS

1 Pane arrangement
2 Transitional area
3 Vehicle windscreen
4 Water box cover
5 Holding section (6 and 7)
6 Holding limb
7 Groove-forming latching section
8 Edge
9 Protruding area
10 Undercut clamping channel
10a Barb on the limb of the groove-forming latching section
10b Barb on the latching hook
11 Latching hook
12 Core
13 Multiply undercut limb
14 End section 15 End face
16 Projection
17 Sealing lip
18 First connecting strip
19 Second connecting strip
20 Surface
21 Intersection point
22 Centre line
23 First spacer
24 Second spacer
25 Lever arm
A Spacing

The invention claimed is:

1. A pane arrangement comprising:
   a pane; and
   a holding section that rejoins a water box cover to the pane, the holding section being connected to the pane via a first connecting strip and a second connecting strip,
   wherein the first and second connecting strips extend longitudinally parallel to a longitudinal edge of the pane, the first connecting strip being a self-adhesive tape so as to connect to a surface of the pane, the second connecting strip being an adhesive applied in a fluid state so as to connect to the surface of the pane, and the adhesive of the second connecting strip having a greater hardness than the self-adhesive tape of the first connecting; strip, and
   wherein the second connecting strip is arranged nearer the edge of the pane than the first connecting strip.

2. The pane arrangement according to claim 1, wherein the self-adhesive tape includes a foamlike middle layer and two adhesive layers arranged on opposite visible surfaces of the tape, and
   wherein the adhesive applied in the fluid state is a polyurethane (PU)-based adhesive, silicone, acrylates, hotmelt, or 2-component adhesive.

3. The pane arrangement according to claim 1, wherein the holding section includes at least one spacer in a region of the first and second connecting strips, the at least one spacer being connected integrally with the holding section and being in contact with the surface of the pane, and
   wherein a height of the at least one, spacer defines a thickness of the layer of the adhesive of the second connecting strip.

4. The pane arrangement according to claim 3, wherein the holding section includes first and second strip-shaped or bead-shaped spacers that extend in a longitudinal direction of the connecting strips, the second strip-shaped or bead-shaped spacer being disposed raised within the second connecting strip, and the first strip-shaped or bead-shaped spacer forming an edge closure of the first connecting strip and the holding section.

5. The pane arrangement according to claim 1, wherein the holding section includes
   a core, and
   a coating surrounding the core, the coating made from plastic material which is a more flexible material than a material of the core, which is stiffer than the material of the coating, and
   wherein the coating is applied by extrusion or injection molding around the core.

6. The pane arrangement according to claim 5, wherein the core consists of a metallic material, such as aluminium, stainless steel, titanium, spring steel, or structural steel.

7. The pane arrangement according to claim 5, wherein the holding section includes a clamping channel that is undercut in cross section and extends parallel to the edge of the pane.

8. The pane arrangement according to claim 7, wherein the holding section includes a limb that faces the edge of the pane and bounds the clamping channel, the limb including an end section made from an elastomeric material that is more flexible than the material of the coating, the end section being integrally formed with the holding section by coextrusion, and the end section touching an end face of the pane coming out from the edge of the pane, such that a free space remains between the limb with the end section and the end face of the pane.

9. The pane arrangement according to claim 5,
   wherein the holding section further includes
       a clamping channel that extends parallel to the edge of the pane, and
       a limb that faces the edge of the pane and delimits an inside of the clamping channel, and
   wherein the core includes
       a first portion that extends through the holding section widthwise such that a first segment of the first portion of the core extends parallel to a plane of the surface of the pane and is disposed adjacent to the first and second connecting strips, and a second segment of the first portion of the core extends with a shape of the clamping channel, and
       a second portion that extends through the limb of the holding section.

10. The pane arrangement according to claim 1, wherein the first connection strip abuts the second connecting strip on a lateral edge thereof.

* * * * *